United States Patent [19]

Meunier

[11] 4,277,205
[45] Jul. 7, 1981

[54] APPARATUS FOR DISTRIBUTION OF SOLID PARTICLES

[75] Inventor: Georges Meunier, Fontaines par Chagny, France

[73] Assignee: Saint Gobain Industries, Neuilly-sur-Seine, France

[21] Appl. No.: 50,053

[22] Filed: Jun. 19, 1979

[30] Foreign Application Priority Data

Jun. 19, 1978 [FR] France ................. 78 18291

[51] Int. Cl.³ .......................... B65G 53/18
[52] U.S. Cl. ................... 406/123; 239/654; 239/214.25; 406/157; 406/181; 414/301
[58] Field of Search ............... 406/90, 123, 138, 155, 406/165, 157, 181; 239/143, 222, 223, 214.25, 654; 414/301

[56] References Cited

U.S. PATENT DOCUMENTS

| | | | |
|---|---|---|---|
| 1,646,224 | 10/1927 | Thompson | 406/123 |
| 3,190,470 | 6/1965 | Ritter . | |
| 3,804,273 | 4/1974 | Uhl | 239/666 X |
| 3,942,721 | 3/1976 | Wirth et al. | 239/15 |
| 3,972,686 | 8/1976 | Johnson et al. | 239/687 X |
| 3,995,753 | 12/1976 | Millar et al. | 222/410 X |
| 4,039,431 | 8/1977 | Baillie | 208/146 |

FOREIGN PATENT DOCUMENTS 531465 7/1931 Fed. Rep. of Germany ......... 406/157
1085091 7/1960 Fed. Rep. of Germany ......... 406/138
1340345 12/1973 United Kingdom .

*Primary Examiner*—Jeffrey V. Nase
*Attorney, Agent, or Firm*—Pennie & Edmonds

[57] ABSTRACT

An apparatus is disclosed for distributing solid particles of the type having a stationary sub-assembly for feeding particles, and positioned at its lower portion, a rotary sub-assembly for distributing the particles, wherein the rotary distribution sub-assembly includes an axial gas feed conduit (10) configured and dimensioned to exit a fluidization gas under a fluidization grate (20) positioned in the lower portion of a centrally located vat (16). The upper peripheral portions of the vat have connected thereto a plurality of radially extending particle distribution conduits (34). All but one of the distribution conduits (34) are generally straight and are of different lengths. These conduits (34) are connected to the vat at approximately the same vertical level and are slanted approximately equally downwardly about 30°. One of the distribution conduits (34ᵃ) is configured to contain a bend so as to direct solid particles toward the rotational axis of the rotary distribution sub-assembly.

28 Claims, 6 Drawing Figures

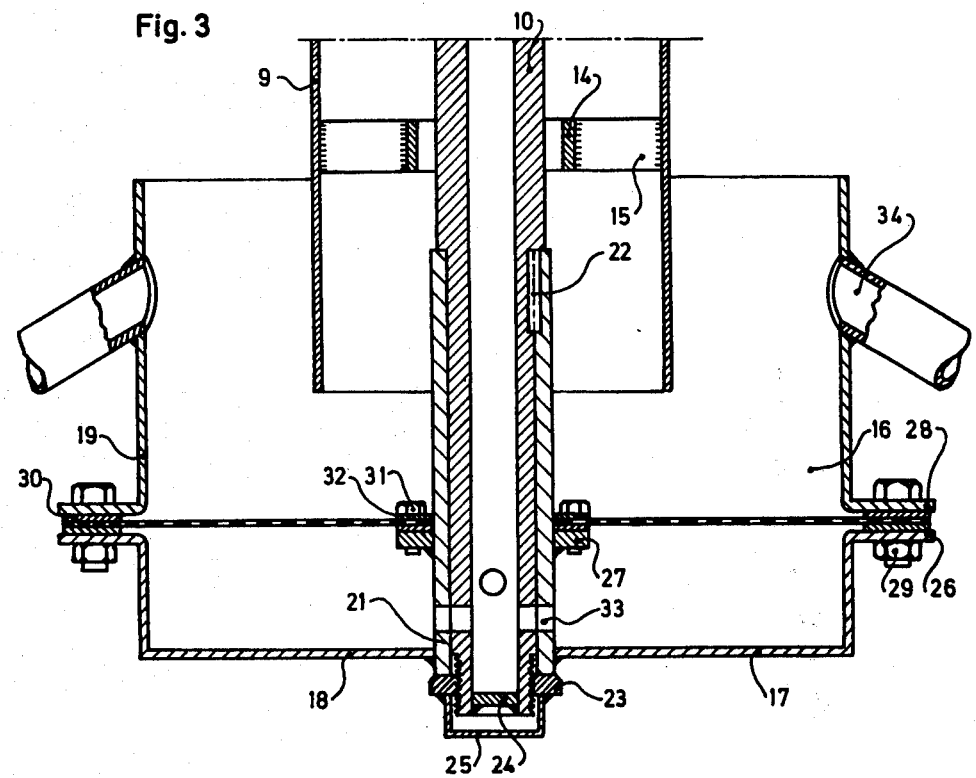
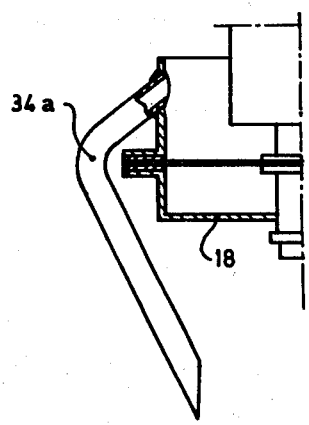
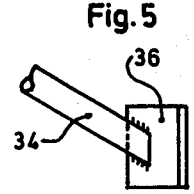
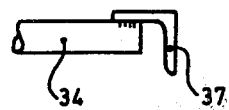

APPARATUS FOR DISTRIBUTION OF SOLID PARTICLES

TECHNICAL FIELD

This invention relates to an apparatus for distribution of solid particles, particularly on the inside of an enclosure through which a gas current travels.

BACKGROUND ART

Various types of solid particle distribution devices which are generally of the rotary or vibrating type are already known. While these devices are capable of distributing solid particles by means of rotating components, they generally have a limited reliability and they generally do not permit operation at high temperatures as, for example, in an enclosure through which a current of hot gases travels. I have invented an apparatus for distributing solid particulate matter which is capable of operating efficiently and at all temperatures including high temperatures and which, even at such high temperatures, is more reliable than presently known devices. In particular, my apparatus is capable of operating at high temperatures without clogging of the particle intake and distribution circuitry.

DISCLOSURE OF THE INVENTION

An apparatus is disclosed for distributing solid particulate matter which comprises stationary means for feeding the particulate matter, rotary particulate matter distributing means positioned below the stationary feed means and having a vat generally centrally positioned thereof, the vat having at least one fluidization grate positioned in its lower portion, gas feed conduit means positioned generally coaxially of the rotary distributing means and opening at a location under the at least one fluidization grate, and a plurality of distribution conduits connected to upper peripheral portions of the vat, at one and the same height, the conduits extending generally radially outwardly from the vat and being adapted to receive and distribute the particulate matter as the rotary distributing means rotates.

In the preferred embodiment, the inventive solid particle distributing apparatus has a stationary particle feed sub-assembly having positioned at its lower part, a rotary particle distribution sub-assembly. The rotary distribution sub-assembly comprises an axial fluidization gas feed conduit coming out under a fluidization grate placed at the lower part of a central vat. The upper peripheral portions of the central vat have a plurality of radially extending particle distributing conduits connected thereto, preferably at the same level and communicating with the inner portion of the vat to receive solid particles from the vat for distribution at a location below the vat.

The central vat is advantageously positioned at the lower portion of the fluidization gas feed conduit, although it is also possible to envisage a gas feed conduit positioned under the vat in applications where particle distribution is preformed annularly.

In the preferred embodiment of the invention, the stationary feed sub-assembly comprises at its lower part a tubular conduit opening out into the central vat about the fluidization grate at a level below that of the connections of the radial distribution conduits.

Further, the tubular conduit of the stationary feed sub-assembly is advantageously concentric with, and exterior to, the axial gas feed conduit of the rotary distribution organ. In addition, the radial distribution conduits may be constructed in the form of pipes or troughs.

In the preferred embodiment of this invention, the distribution conduits are in the form of pipes which are slanted downwardly and uniformly distributed about the periphery of the central vat. The pipes are of different lengths so that the solid particles are uniformly distributed under the apparatus. These pipes are pipes of the same diameter and of the same angle of slant with respect to a horizontal plane.

In order to permit distribution of solid particles under the axis of the apparatus, this apparatus advantageously includes at least one distribution pipe whose free end is angled further downwardly so as to be directed toward the axis of the apparatus under the central vat. The other distribution pipes are advantageously straight pipes of various selected lengths, each preferably provided at its end with a tip member which includes a vertical wall intended to deflect downwardly, the particles flowing through and exiting from the pipe.

Further, to facilitate the axcending movement of a gas current countercurrent to the particles, the distribution conduits may comprise slanted blades serving to aspirate the gas current upwardly like a fan.

BRIEF DESCRIPTION OF THE DRAWINGS

Preferred embodiments of the invention will be described with reference to the drawings wherein:

FIG. 3 is a view on an enlarged scale of the vat of the apparatus of FIG. 1;

FIG. 4 is an enlarged cross sectional view taken along line 4—4 of FIG. 2;

FIG. 5 is a side view of one of the tip members positioned at the end of the straight particle conduits of the apparatus; and FIG. 6 is a top view of the tip member of FIG. 5.

BEST MODE FOR CARRYING OUT THE INVENTION

Figure 1:
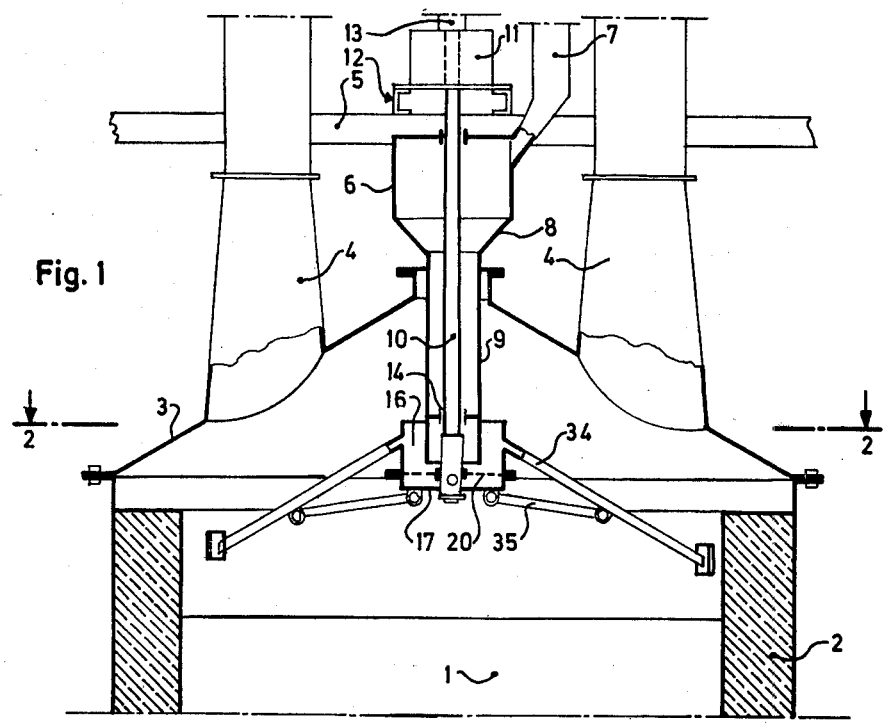
FIG. 1 is a view, partially in cross section, of a distribution apparatus according to the invention installed at the top of a column.

Referring to FIG. 1, the apparatus which is illustrated is placed at the top of a column 1 comprising walls 2 of refractory brick. This column is equipped with a conical cover 3 comprising stacks 4 for evacuation of the gas current moving upwardly through the column.

As shown in the drawings, the distribution apparatus is supported by a frame 5. The apparatus comprises a cylindrical storage tank 6 which is fed solid particles by a chute 7. The cylindrical storage tank 6 has at its lower portion a funnel 8 which is extended by a vertical cylindrical pipe 9 having a smaller diameter than that of storage tank 6.

A pipe 10 extends vertically through the unit which consists of storage tank 6, funnel 8 and pipe 9. Pipe 10 is coaxial with, and has a diameter notably less than that of pipe 9. Pipe 10 is driven in rotation by a mechanical drive device 11 fastened on cross members 12 which rest on frame 5.

Pipe 10 is connected to a coaxial pipe 13 by a turning connection (not shown) so as to rotate therewith. Further, pipe 10 is maintained in the center of pipe 9 by a centering ring 14 welded to pipe 9 by three lugs 15 spaced angularly from each other at 120° intervals, as shown in FIG. 3. The lower part of pipe 10 extends into a cylindrical central vat 16 which is fastened to the lower part of pipe 10.

As shown in FIG. 3, vat 16 is constructed in two parts: one part of vat 16 is a lower cylindrical part 17 which forms an air chamber and has a bottom plate 18; the second part is in the form of an upper cylindrical part 19 separated from lower part 17 by a fluidization grate 20.

Lower part 17 of vat 16 has at its center a vertical pipe 21 which is fitted on the lower end of pipe 10 and which is connected for rotation with pipe 10 by a pin 22. A nut 23 is fastened on a lower threaded part of pipe 10 and assures axial blocking of the vat 16. The lower end of pipe 10 is blocked by a plug 24 which is protected by a cover 24 welded to nut 23.

Lower part 17 of vat 16 includes at its upper portion a collar 26. A ring 27 is welded to the periphery of pipe 21 at approximately the same level as collar 26 as shown particularly in FIG. 3. Correspondingly, upper part 19 of the vat 16 includes a lower collar 28. Grate 20 is fastened between collars 26 and 28 by eight bolts such as 29 and annular joints 30 and is fastened to ring 27 by screws such as 31 and asbestos annular joints 32. Under grate 20 four holes 33 are drilled into pipe 10 at intervals of 90° each and ae intended for the introduction of a fluidization gas current into the lower part of vat 16.

Figure 2:
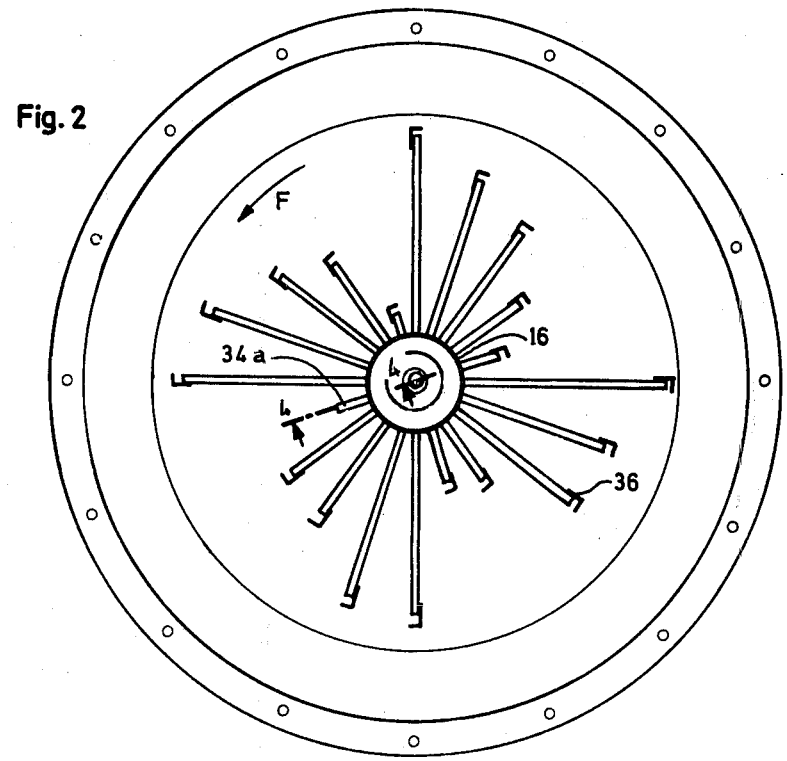
FIG. 2 is a cross sectional view taken along line 2—2 of FIG. 1.

At a level above the lower end of pipe 9, the upper part 19 of vat 16 includes twenty distribution pipes 34 of the same diameter and inclined downwardly at a 30° angle and distributed uniformly about the periphery of the upper part 19. As shown in FIG. 2, distribution pipes 34 have different lengths in order to facilitate distribution of solid particles in the most uniform manner possible on the inside of column 1.

The long distribution pipes are preferably supported as shown in FIG. 1 by arms 35 bolted at the middle of pipes 34 and on botton 18 of vat 16. Further, as shown in FIG. 4, one of distribution pipes 34$^a$ is also slanted 30° downwardly, but exhibits a bend and its end comes out under bottom plate 18 of the central vat and is directed toward the axis of the apparatus. As shown in FIGS. 5 and 6, the ends of the other pipes are preferably each provided with a tip member 36. This tip member 36 is constructed of a plate which is welded laterally to each pipe and whose end is bent 90° clockwise (as shown in FIG. 2) and forms a vertical stop which deflects the flow of the particles downwardly as they exit the pipes 34.

The operation of the apparatus will now be described. Solid particles are introduced by chute 7 and fluidization air is introduced by pipe 13. There is formed in vat 16, above the fluidization grate 20, a fluidizing bed whose overflow flows off and enters pipes 34. Drive device 11 drives in counterclockwise rotation (as shown by arrow F in FIG. 2) pipe 10, vat 16, and pipes 34 which thus uniformly and regularly distribute the solid particles in the column. The fluidized bed of solid particulate matter not only makes possible a regular flow of solid particles but also constitutes a hydraulic guard which prevents the gases going through the column from escaping through the feed apparatus and the solid particles.

By way of example, an apparatus according to the invention is used in a column having an inside diameter of 156 cm. Pipe 6 has an inside diameter of 150 mm and pipe 10 an inside diameter of 20 mm. Vat 16 has an inside diameter of 292 mm. Distribution pipes 34 have an inside diameter of 20 mm. One of these pipes is a bent or curved pipe, as shown in FIG. 4, and at one end is located 115 mm from the axis of rotation.

The other distribution pipes have ends located respectively clockwise from the curved pipe at the following distances from the axis of rotation (in mm): 683, 622, 503, 416, 200, 702, 600, 529, 383, 258, 721, 577, 554, 346, 305, 663, 643, 476 and 447.

Sand having the following granulometry is introduced as follows:

1% < 100 μm

18% < 160 μm

45% < 200 μm

80% < 250 μm

99% < 400 μm

The fluidization gas pressure is regulated at 150 mm of a column of water. This pressure results in 50 mm of water column of load loss in the grate and 100 mm of column of water load loss in the fluidized bed. The surface speed of the gas in the bed is on the order of about 10 cm/s.

The height of the fluidized bed is 80 to 90 mm.

The rotation speed of the distribution pipes is 47 rpm.

There is thus obtained a regular and uniform distribution of the sand at the top of the column, with a sand delivery which can vary from 1 to 4 tons/hour.

It has been found that the present apparatus can operate at high temperatures without clogging of the intake circuitry or solid particle distribution paths.

I claim:

1. An apparatus for distributing solid particulate matter which comprises a generally vertical tubular conduit for receiving the particulate matter, rotary particulate matter distributing means positioned at the lower portion of said generally vertical tubular conduit and having a vat, said vat being open at the top and having at least one fluidization grate positioned in its lower portion, said generally vertical tubular conduit opening into said vat at a location above said fluidization grate so as to permit directing the particulate matter onto said fluidization grate, gas feed conduit means positioned generally coaxially of said rotary distributing means and opening at a location under said at least one fluidization grate to fluidize the particulate matter directed to said fluidization grate, and a plurality of distribution conduits connected to upper peripheral portions of said vat, each of said distribution conduits being connected thereto at substantially the same height, said generally vertical tubular conduit opening into said vat at a location below the locations of connection of said distribution conduits to said vat to thereby permit formation of a fluidized bed of said particulate matter above the level of the lower opening of said generally vertical tubular conduit thereby preventing gas exchanges above said fluidized bed between the atmospheres inside and outside of said generally vertical tubular conduit, said distribution conduits extending generally radially outwardly from said vat and being adapted to receive and distribute particulate matter overflowing from said fluidization grate as said rotary distributing means rotates.

2. The apparatus for distributing solid particulate matter according to claim 1, wherein said central vat is positioned at the lower portion of said gas feed conduit.

3. The apparatus for distributing solid particulate matter according to claim 2, wherein said distribution conduits are in the form of pipes extending radially outwardly from the locations of connection to said vat and slanted generally downwardly from said locations of connection, said conduits further being distributed generally uniformly about peripheral portions of said vat and being of different lengths so as to facilitate generally uniform distribution of the solid particulate matter below the apparatus.

4. The apparatus for distributing solid particulate matter according to claim 3, wherein said distribution pipes are of the same diameter and are slanted downwardly at approximately the same angle.

5. The apparatus for distributing solid particulate matter according to claim 4, wherein at least one of said distribution conduits is bent downwardly such that its free end is directed toward the central axis of said rotary distribution vat to direct solid particulate matter under said central vat.

6. The apparatus for distributing solid particulate matter according to claim 1, wherein said generally tubular conduit is concentric with and external to said gas feed conduit means of said rotary distributing means.

7. The apparatus for distributing solid particulate matter according to claim 6, wherein said distribution conduits are in the form of pipes extending radially outwardly from the locations of connection to said vat and slanted generally downwardly from said locations of connection, said conduits further being distributed generally uniformly about peripheral portions of said vat and being of different lengths so as to facilitate generally uniform distribution of the solid particulate matter below the apparatus.

8. The apparatus for distributing solid particulate matter according to claim 7, wherein said distribution pipes are of the same diameter and are slanted downwardly at approximately the same angle.

9. The apparatus for distributing solid particulate matter according to claim 8, wherein at least one of said distribution conduits is bent downwardly such that its free end is directed toward the central axis of said rotary distribution vat to direct solid particulate matter under said central vat.

10. The apparatus for distributing solid particulate matter according to claim 1, wherein said distribution conduits are in the form of pipes extending radially outwardly from the locations of connection to said vat and slanted generally downwardly from said locations of connection, said conduits further being distributed generally uniformly about peripheral portions of said vat and being of different lengths so as to facilitate generally uniform distribution of the solid particulate matter below the apparatus.

11. The apparatus for distributing solid particulate matter according to claim 10, wherein said distribution pipes are of the same diameter and are slanted downwardly at approximately the same angle.

12. The apparatus for distributing solid particulate matter according to claim 11, wherein at least one of said distribution conduits is bent downwardly such that its free end is directed toward the central axis of said rotary distribution vat to direct solid particulate matter under said central vat.

13. The apparatus for distributing solid particulate matter according to claim 12, wherein at least one of said distribution conduits has positioned at open end portion, means for deflecting particulate matter exiting therefrom sidewardly so as to be distributed at a location below said rotary distributing means.

14. The apparatus for distributing solid particulate matter according to claim 12, wherein said distribution conduits are slanted downwardly from the vat connections at an angle of approximately 30°.

15. The apparatus for distributing solid particulate matter according to claim 11, wherein at least one of said distribution conduits has positioned at open end portion, means for deflecting particulate matter exiting therefrom sidewardly so as to be distributed at a location below said rotary distributing means.

16. The apparatus for distributing solid particulate matter according to claim 11, wherein said distribution conduits are slanted downwardly from the vat connections at an angle of approximately 30°.

17. The apparatus for distributing solid particulate matter according to claim 10, wherein at least one of said distribution conduits has positioned at its open end portion, means for deflecting particulate matter exiting therefrom sidewardly so as to be distributed at a location below said rotary distributing means.

18. The apparatus for distributing solid particulate matter according to claim 10, wherein said distribution conduits are slanted downwardly from the vat connections at an angle of approximately 30°.

19. The apparatus for distributing solid particulate matter according to claim 1, wherein at least one of said distribution conduits has positioned at its open end portion, means for deflecting particulate matter exiting therefrom sidewardly so as to be distributed at a location below said rotary distributing means.

20. The apparatus for distributing solid particulate matter according to claim 19, wherein at least one of said distribution conduits is generally straight.

21. The apparatus for distributing solid particulate matter according to claim 20, wherein at least one of said distribution conduits is bent so as to form at least two straight sections angled with respect to each other, the lower straight section being oriented and positioned to direct said particulate matter toward the axis of said rotary feed distributing means so as to deposit the particulate matter under said central vat.

22. The apparatus for distributing solid particulate matter according to claim 19, wherein said distribution conduits are slanted downwardly from the vat connections at an angle of approximately 30°.

23. The apparatus for distributing solid particulate matter according to claim 1, wherein said distribution conduits are slanted downwardly from the vat connections at an angle of approximately 30°.

24. A solid particle distribution apparatus which comprises a stationary particle feed means having at its lower portion a rotary particle distribution means, said rotary particle distribution means having a central vat positioned and adapted to rotate about a central vertical rotational axis and having a fluidization grate positioned at the lower portion thereof for reception of solid particulate matter, an axial gas feed conduit positioned generally centrally of said rotary particle distribution means and adapted to convey fluidation gases to at least one opening positioned below said fluidization grate, a plurality of particle distribution pipes positioned generally uniformly about said central vat and connected to upper peripheral portions thereof so as to extend generally radially outwardly of said vat and to slant generally downwardly from the connections thereto, said particle distribution pipes communicating with said vat so as to receive solid particles therefrom and to direct said particles to respective openings at the outer end portions thereof, said distribution pipes further being slanted substantially equally downwardly from the vat connections at angles of approximately 30° with a horizontal plane and being of different lengths so as to direct solid particles to different radial locations with respect to the axis of said rotary distribution means as said vat rotates, at least one of said particle distribution pipes being further angled downwardly and inwardly toward the rotational axis of said vat so as to distribute particles toward the rotational axis of said vat at a location thereunder and at least certain of the remaining distribution conduits having means at their outer end portions to deflect solid particles exiting therefrom in a generally downward direction so as to facilitate distribution and collection of the solid particles generally uniformly at different radial locations below said rotary distribution means.

25. The solid particle distribution apparatus according to claim 24 wherein said stationary particle feed means and said rotary particle distribution means are positioned vertically at the top of a column through which hot gases are directed upwardly and said distribution apparatus distributes solid particles uniformly within said column.

26. An apparatus for distributing solid particulate matter which comprises stationary means for feeding the particulate matter, rotary particulate matter distributing means positioned below said stationary feed means and having a vat generally centrally positioned thereof, said vat having at least one fluidization grate positioned in its lower portion, gas feed conduit means positioned generally coaxially of said rotary distributing means and opening at a location under said at least one fluidization grate, and a plurality of distribution conduits connected to upper peripheral portions of said vat, each of said distribution conduits being connected thereto at substantially the same height and being in the form of pipes of the same diameter extending radially outwardly from the locations of connection to said vat and slanted downwardly from said locations of connection at approximately the same angle, said distribution conduits being adapted to receive and distribute the solid particulate matter as said rotary distributing means rotates, said distribution conduits being distributed generally uniformly about peripheral portions of said vat and being of different lengths so as to facilitate generally uniform distribution of the solid particulate matter therebelow, and at least one of said distribution conduits being bent downwardly such that its free end is directed toward the central axis of said rotary distribution vat to direct the solid particulate matter under said central vat.

27. An apparatus for distributing solid particulate matter which comprises stationary feed means for feeding the particulate matter, rotary particulate matter distributing means positioned below said stationary feed means and having a vat generally centrally positioned thereof, said vat having at least one fluidization grate positioned in its lower portion, gas feed conduit means positioned generally coaxially of said rotary distributing means and opening at a location under said at least one fluidization grate, and a plurality of distribution conduits connected to upper peripheral portions of said vat, each of said distribution conduits being connected thereto at substantially the same height, said conduits extending generally radially outwardly from said vat and being adapted to receive and distribute particulate matter as said rotary distributing means rotates, at least one of said distribution conduits having positioned at its open end portion means for deflecting particulate matter exiting therefrom sidewardly so as to be distributed at a location below said rotary distributing means, at least one of said distribution conduits being generally straight, and at least one of said distribution conduits being bent so as to form at least two straight sections angled with respect to each other, the lower straight section being oriented and positioned to direct said particulate matter toward the axis of said rotary distributing means so as to deposit the particulate matter under said central vat.

28. An apparatus for distributing solid particulate matter which comprises stationary means for feeding the particulate matter, rotary particulate matter distributing means positoned below said stationary feed means and having a vat generally centrally positioned thereof, said vat having at least one fluidization grate positioned in its lower portion, gas feed conduit means positioned generally coaxially of said rotary distributing means and opening at a location under said at least one fluidization grate, and a plurality of distribution conduits connected to upper peripheral portions of said vat, each of said distribution conduits being connected thereto at substantially the same height and being in the form of pipes of the same diameter extending radially outwardly from the locations of connection to said vat and slanted downwardly from said locations of connection at an angle of approximately 30°, said distribution conduits being adapted to receive and distribute the solid particulate matter as said rotary distributing means rotates, said distribution conduits being distributed generally uniformly about peripheral portions of said vat and being of different lengths so as to facilitate generally uniform distribution of the solid particulate matter therebelow, and at least one of said distribution conduits being bent downwardly such that its free end is directed toward the central axis of said rotary distribution vat to direct the solid particulate matter under said central vat.

* * * * *

UNITED STATES PATENT AND TRADEMARK OFFICE
CERTIFICATE OF CORRECTION

PATENT NO. : 4,277,205
DATED : July 7, 1981
INVENTOR(S) : Georges Meunier

It is certified that error appears in the above-identified patent and that said Letters Patent are hereby corrected as shown below:

Column 3, line 17, "cover 24" should read --cover 25--;

Column 3, line 27, "ae" should read --are--;

Signed and Sealed this

First Day of December 1981

[SEAL]

Attest:

GERALD J. MOSSINGHOFF

Attesting Officer     Commissioner of Patents and Trademarks